(12) United States Patent
Ho

(10) Patent No.: US 8,556,484 B2
(45) Date of Patent: Oct. 15, 2013

(54) FREELY PLASTICALLY FLEXIBLE LIGHT-EMITTING STRIP STRUCTURE

(76) Inventor: Chang-Hsien Ho, Taoyuan County (TW)

( * ) Notice: Subject to any disclaimer, the term of this patent is extended or adjusted under 35 U.S.C. 154(b) by 303 days.

(21) Appl. No.: 12/382,262

(22) Filed: Mar. 12, 2009

(65) Prior Publication Data

US 2010/0232175 A1    Sep. 16, 2010

(51) Int. Cl.
*F21V 7/04* (2006.01)
*G02B 6/00* (2006.01)
*G09F 13/00* (2006.01)

(52) U.S. Cl.
USPC .............................. 362/551; 362/555; 362/556

(58) Field of Classification Search
USPC ............... 362/551–582, 219, 249.02, 249.13, 362/249.16
See application file for complete search history.

(56) References Cited

U.S. PATENT DOCUMENTS

| | | | |
|---|---|---|---|
| 3,841,730 A * | 10/1974 | Karelitz | 359/617 |
| 4,600,974 A * | 7/1986 | Lew et al. | 362/102 |
| 4,732,442 A * | 3/1988 | Mori | 362/551 |
| 6,481,882 B1 * | 11/2002 | Pojar | 362/559 |
| 2005/0063179 A1 * | 3/2005 | Niemann | 362/184 |

* cited by examiner

*Primary Examiner* — Jason Moon Han
(74) *Attorney, Agent, or Firm* — Bacon & Thomas, PLLC

(57) ABSTRACT

A freely plastically flexible light-emitting strip structure, which is a hollow light guide strip body made of transparent material. The light guide strip body is formed with at least one axial internal chamber. A plastically flexible strip body is implanted in the internal chamber. Recessed/raised sections are formed on a wall of the internal chamber for changing light path. When a light source projects light into the internal chamber, the recessed/raised sections deflect or reflect the projected light, whereby the light guide strip body can emit light outward. The plastically flexible strip body makes the light guide strip body plastically flexible and self-patternable. Accordingly, the configuration of the light guide strip body is freely adjustable in accordance with the requirements of use sites so as to enlarge application range and provide enhanced decorative or warning effect.

27 Claims, 17 Drawing Sheets

FREELY PLASTICALLY FLEXIBLE LIGHT-EMITTING STRIP STRUCTURE

BACKGROUND OF THE INVENTION

The present invention relates generally to a freely plastically flexible light-emitting strip structure, and more particularly to a hollow light guide strip body made of transparent material. The light guide strip body is formed with an axial internal chamber. A plastically flexible strip body is implanted in the internal chamber. Recessed/raised sections are formed on a wall of the internal chamber for changing light path.

A conventional lamp tube is made of a hard tubular body such as a glass tube. The tubular body is bent into a desired shape. An inert gas is filled in the tubular body. When electric current passes through the lamp tube, the inert gas will discharge to emit light. Recently, various light bulbs and LED lights have been developed. The light bulbs and LED lights are able to emit colorful light. The conventional lamp tube is relatively hard to manufacture so that the manufacturing cost is relatively high. Also, the conventional lamp tube has fixed pattern, which cannot be freely changed. Moreover, the conventional lamp tube is likely to break and damage due to infiltration of water (such as rainwater) or impact. Furthermore, one lamp tube can only emit single color of light at high power consumption. Also, the configuration and size of the light tube cannot be miniaturized and changed. When it is desired to present a different configuration, it is necessary to previously process and mold the lamp tube with a mold or use at least two lamp tubes in combination with a mount, which will affect the appearance as a whole. Therefore, it is quite inconvenient and expensive to use such lamp tube.

Recently, various light-emitting strips or light guide strips have been widely used in various fields to provide illumination or highlighting effect for some sites or articles. For example, the light-emitting strips or light guide strips are applicable to a transportation tool for providing warning effect, especially in a dim place. In general, such light-emitting strips or light guide strips are arranged on a mount to reflect light or flicker so as to provide warning effect for environmental cars and passengers. In some cases, the light-emitting strips or light guide strips are applied to a billboard, anti-collision device of a car, a wear, a safety helmet and a convenient transportation tool (such as a motorcycle or a bicycle). However, due to the high manufacturing cost and unchangeable pattern, the use of the light-emitting strips or light guide strips is still hard to popularize. As a result, low-cost light reflection sign or a low-brightness flickering device is still often applied to a transportation tool for providing warning effect. Such reflection sign or flickering device can only achieve limited warning effect, especially to those drivers driving cars at high speed. Also, it is rare for a passenger to wear a self-lighting safety device. Therefore, in an outdoor environment with insufficient illumination, the passenger is likely to be hit by a transportation tool.

Moreover, in daily life, it often takes place that a simple illuminator with variable configuration is needed for providing illumination or highlighting effect. However, currently, there is no such simple illuminator the configuration of which is freely changeable in accordance with the requirements of use sites.

Also, the conventional light-emitting strip or light guide strip body is made of soft transparent material and is not self-supportable. Therefore, a rigid support or mount is needed to lay the light-emitting strip or light guide strip body in a predetermined pattern. The additional support or mount leads to increment of manufacturing cost. Also, the support or mount will deteriorate the appearance and increase the volume and weight as a whole. Therefore, it will become inconvenient to carry the light-emitting strip or light guide strip body.

It is therefore tried by the applicant to provide a low-cost light-emitting strip structure, which is freely plastically flexible and self-patternable and is able to more apparently emit light.

SUMMARY OF THE INVENTION

It is therefore a primary object of the present invention to provide a freely plastically flexible light-emitting strip structure. The light-emitting strip structure is a hollow light guide strip body made of transparent material. The light guide strip body is formed with an axial internal chamber. A plastically flexible strip body is implanted in the internal chamber. Recessed/raised sections are formed on a wall of the internal chamber for changing light path. When a light source projects light into the internal chamber, the recessed/raised sections will deflect or reflect the projected light, whereby the light guide strip body can emit light outward. In addition, the plastically flexible strip body makes the light guide strip body plastically flexible and self-patternable. Accordingly, the light guide strip body can be freely flexed or wound into any configuration as desired so as to enlarge application range and provide enhanced luminance uniformity as well as save energy and promote practicability.

It is a further object of the present invention to provide the above light-emitting strip structure, in which the plastically flexible strip body makes the light guide strip body plastically flexible and self-supportable. Therefore, the light guide strip body can keep the configuration after being preformed without any supporting article or mount. Accordingly, the luminous pattern of the light guide strip body is freely directly plastically re-formable in accordance with personal desire. After being re-formed, the light guide strip body will keep the pattern without collapsing. That is, the freely plastically flexible light-emitting strip structure has a "shape memory." Therefore, the light guide strip body can emit light in any predetermined direction in a solid pattern so as to versatilely and elastically provide decorative or warning effect.

It is still a further object of the present invention to provide the above light-emitting strip structure, which is soft, freely plastically flexible and self-supportable, whereby the possibility of damage of the light guide strip body due to impact is minimized.

According to the above objects, the freely plastically flexible light-emitting strip structure of the present invention is a hollow light guide strip body made of transparent material. The light guide strip body is formed with an axial internal chamber. A plastically flexible strip body is axially implanted in the internal chamber. Recessed/raised sections are formed on a wall of the internal chamber for changing light path. A light source is positioned beside at least one end of the light guide strip body to project light into the internal chamber. When the light is axially projected into the light guide strip body, the recessed/raised sections will deflect or reflect the projected light, whereby the light guide strip body can emit light outward.

A color bar or a light reflection strip is implanted in the internal chamber. In addition, a light absorption material is sprayed on the wall of the internal chamber or a photosensitive gas is filled in the internal chamber. Accordingly, the light guide strip body can emit colorful light in various patterns so as to provide enhanced decorative or warning effect.

A light uniformity element is positioned at the end of the light guide strip body. The light projected from the light source first passes through the light uniformity element and then is incident upon the end of the light guide strip body. The light uniformity element serves to uniformly guide and spread the light of the light source. Accordingly, the light of the light source is prevented from being collectively incident upon the center of the end of the light guide strip body. Therefore, the light will not be stopped and reflected by the plastically flexible strip body to cause loss of most of the light. Also, the light will not directly pass through the center of the internal chamber and dissipate from the other end of the light guide strip body. Therefore, the entire light guide strip body can emit light with higher brightness and luminance uniformity.

An outer circumference of the light guide strip body is formed with a channel. An insertion rib of an article can be directly inserted and held in the channel to connect the light guide strip body with the article.

The recessed/raised sections can be continuous recessed/raised stripes formed on the wall of the internal chamber. The recessed/raised stripes serve to deflect or reflect the light in all directions so that the light guide strip body is able to emit light universally. Alternatively, the recessed/raised sections can be spaced pictures or characters distributed over the wall of the internal chamber.

A light absorption material is sprayed on the wall of the internal chamber or a photosensitive gas (such as an inert gas) is filled in the internal chamber. Accordingly, the light guide strip body can emit colorful light in various patterns so as to provide enhanced decorative-or warning effect in different fields.

The light guide strip body has certain flexibility (softness) and is antishock. Therefore, the light guide strip body will not be damaged due to impact of alien article or shock. Accordingly, the flexible light guide strip body can be applied to a pole of a road warning sign or used as a light-emitting link between two road barriers to expand the lighting range and enhance warning effect.

The present invention can be best understood through the following description and accompanying drawings, wherein:

DETAILED DESCRIPTION OF THE PREFERRED EMBODIMENTS

Figure 1:
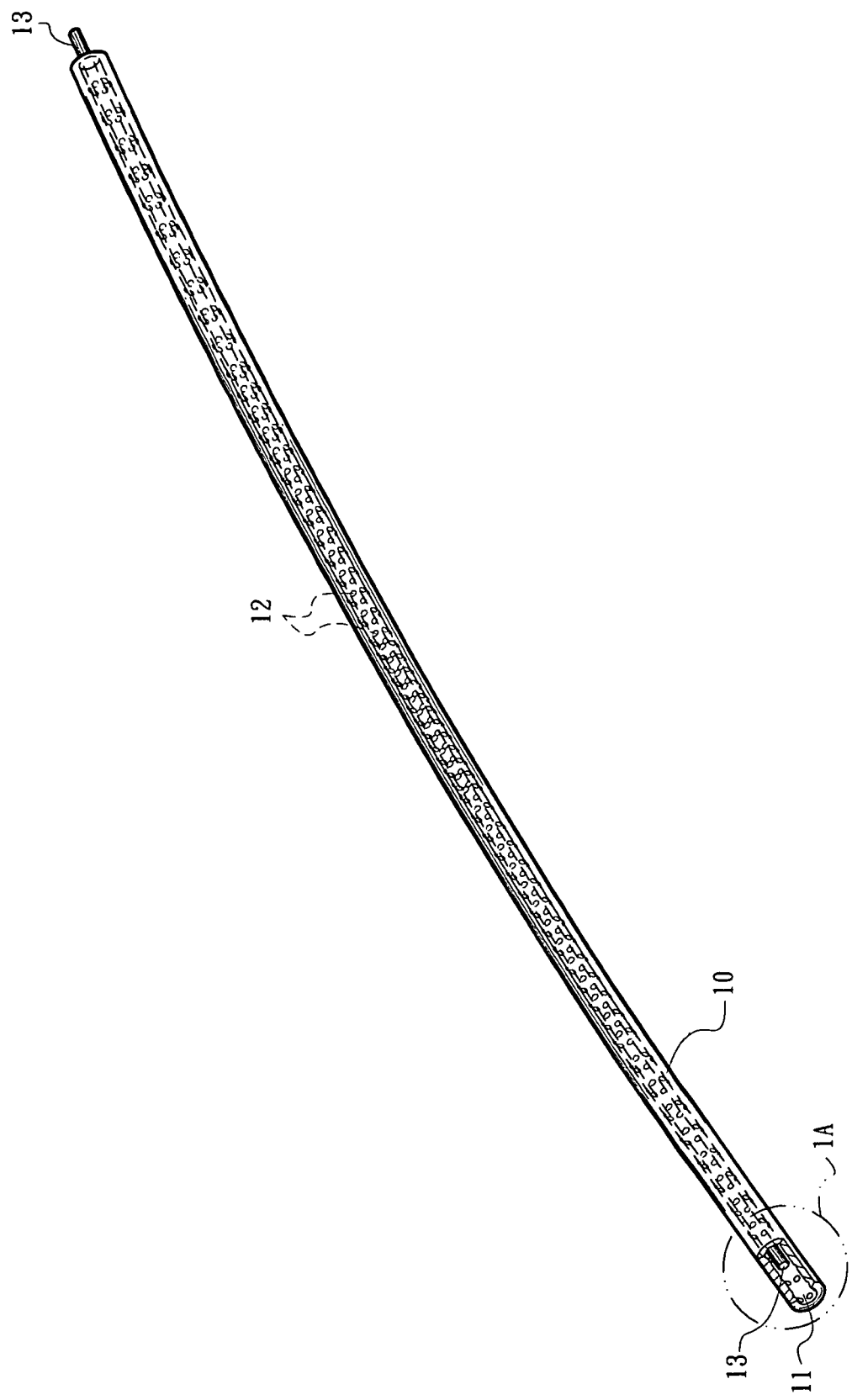
FIG. 1 is a perspective view of a first embodiment of the present invention.
Figure 2:
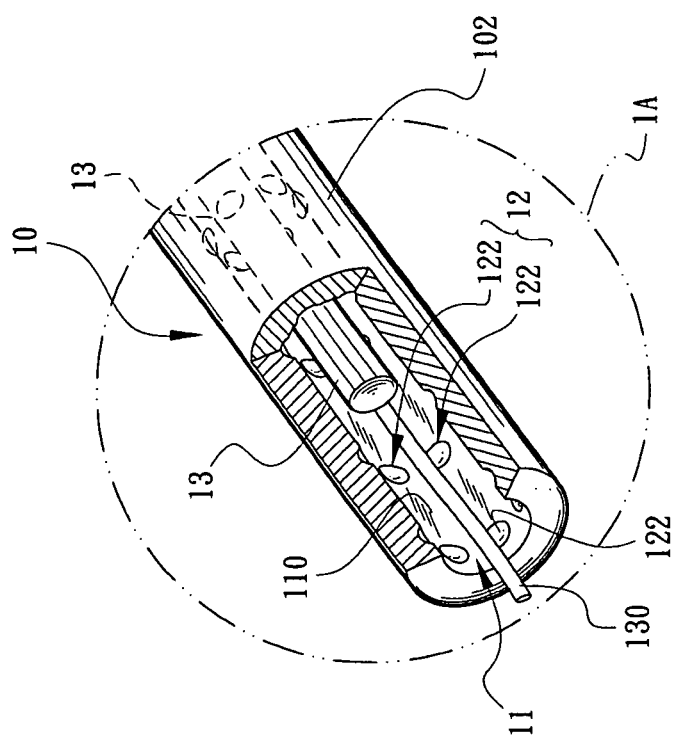
FIG. 2 is an enlarged view of circled area 1A of FIG. 1.

Please refer to FIGS. 1 to 6. The present invention relates to a hollow light guide strip body 10 made of transparent material. The hollow light guide strip body 10 is formed with an internal chamber 11 extending along an axis of the light guide strip body 10. At least one recessed/raised section 12 is formed on an inner circumferential wall 110 (or outer circumferential wall 102) of the internal chamber 11 for changing light path. In addition, a plastically flexible strip body 13 is axially implanted in the internal chamber 11.

Figure 3:
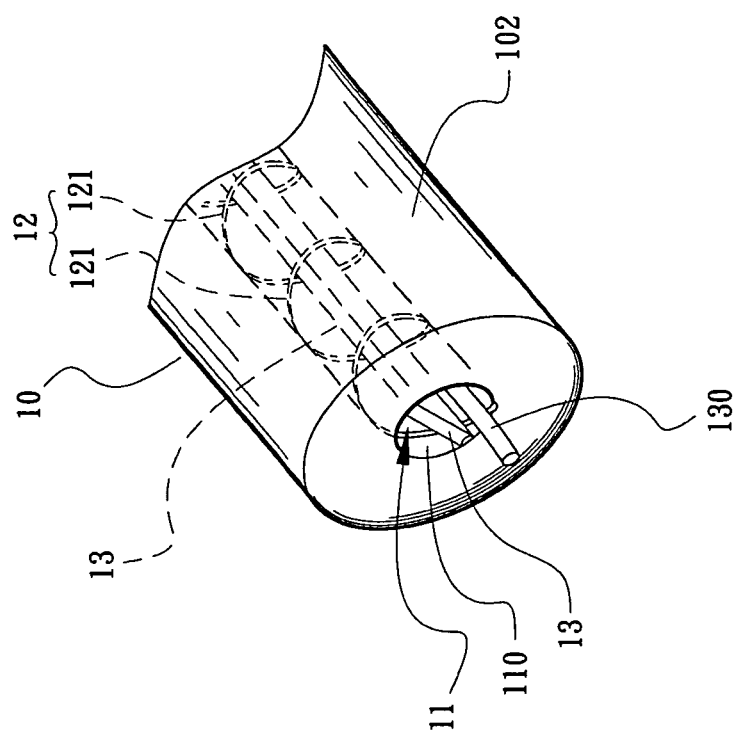
FIG. 3 is an enlarged perspective view of a part of a second embodiment of the present invention.

As shown in FIGS. 1 and 3, the recessed/raised sections 12 can be recessed/raised dots 122 distributed over the inner circumferential wall 110 (or outer circumferential wall 102) of the internal chamber 11 with a uniform or non-uniform density. Alternatively, the recessed/raised section 12 can be at least one spiral recessed/raised stripe 121 spirally extending through the wall 110 of the internal chamber 11. Still alternatively, the recessed/raised sections 12 can be axial parallel recessed/raised stripes 120. Still alternatively, the recessed/raised sections 12 can be recessed/raised pictures or characters 123 distributed at least partially over the inner circumferential wall 110 (or outer circumferential wall 102). A light source 20 can be positioned beside one end of the light guide strip body 10 to project light thereto. When the light source 20 axially projects the light into the end of the light guide strip body 10, the recessed/raised sections 12 will deflect or reflect the projected light. In this case, every recessed/raised sections 12 will guide the light toward outer side of the light guide strip body 10 to emit light. Therefore, an observer can easily clearly see the light guide strip body 10 in any direction or at any angle. Accordingly, the light guide strip body 10 can provide apparent warning effect.

In addition, a color bar or a light reflection strip 130 can be implanted in the internal chamber 11 of the light guide strip body 10. Moreover, a light absorption material can be sprayed on the inner circumferential wall 110 or a photosensitive gas (not shown) with a certain concentration can be filled into the internal chamber 11 to achieve versatile light projection effects for different application fields.

Figure 5:
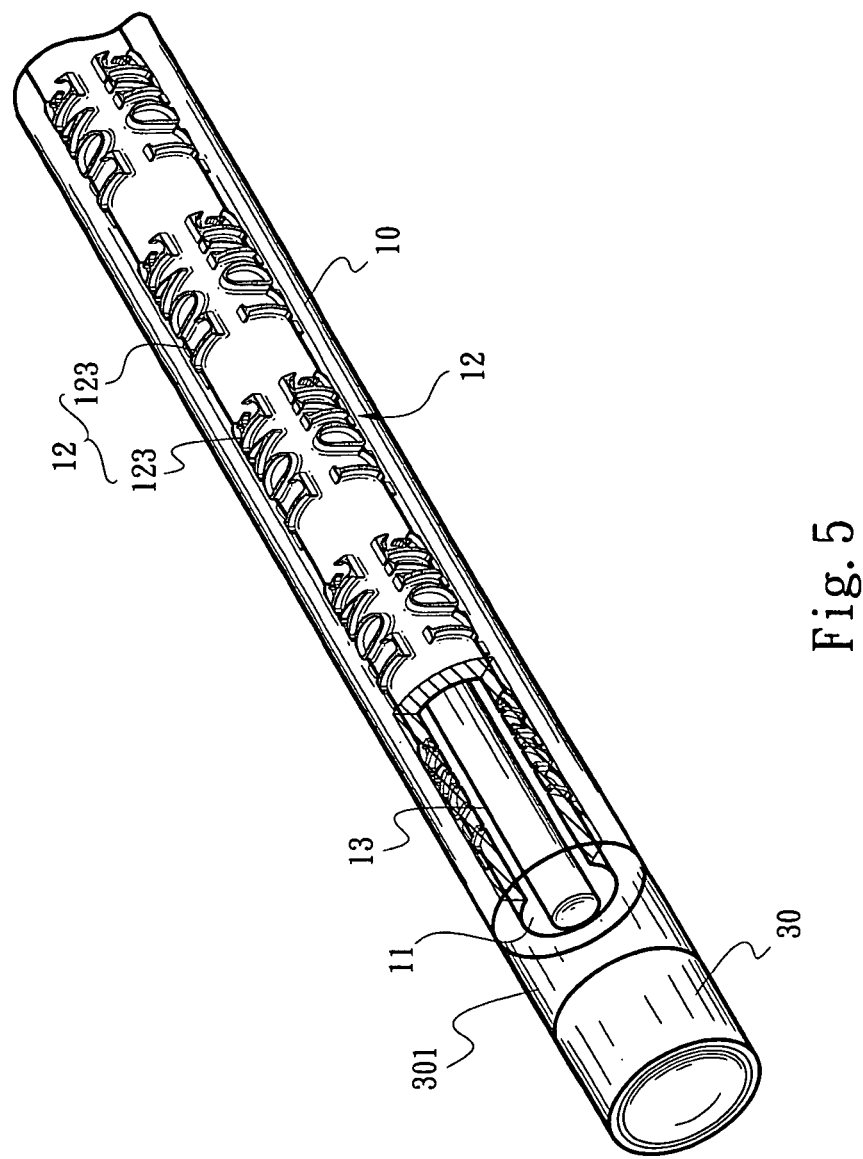
FIG. 5 is a perspective view of a fourth embodiment of the present invention.
Figure 6:
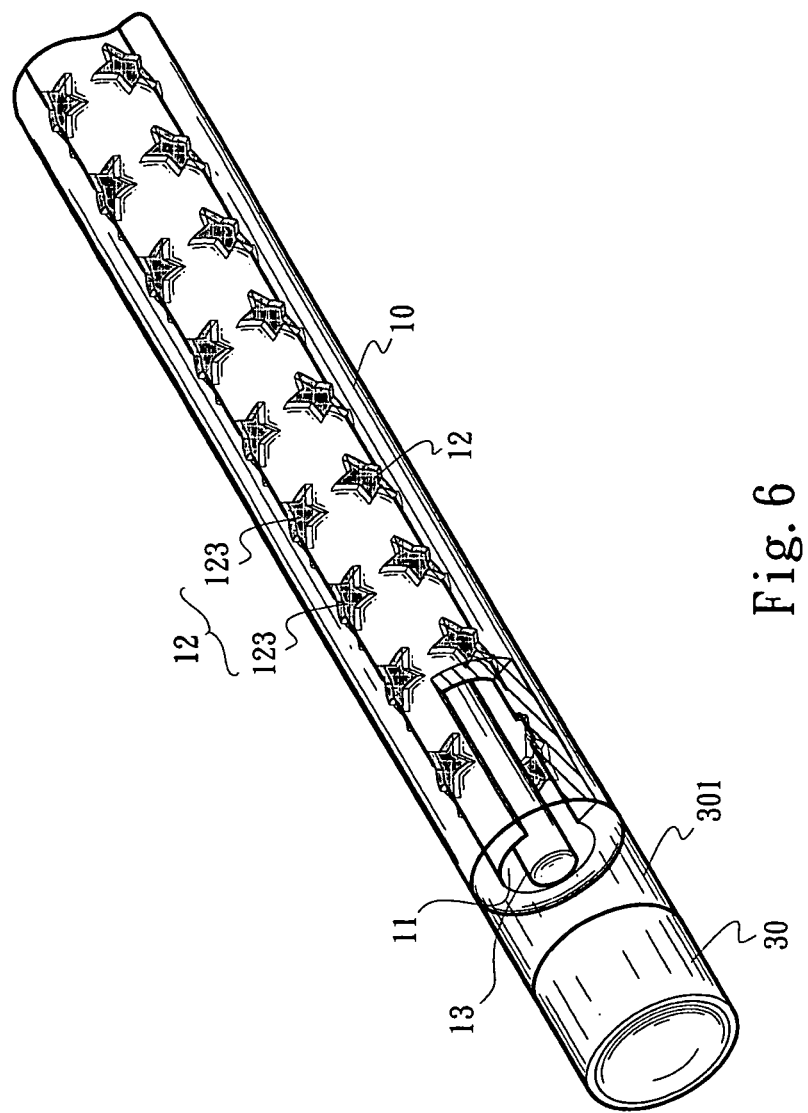
FIG. 6 is a perspective view of a fifth embodiment of the present invention.
Figure 7:
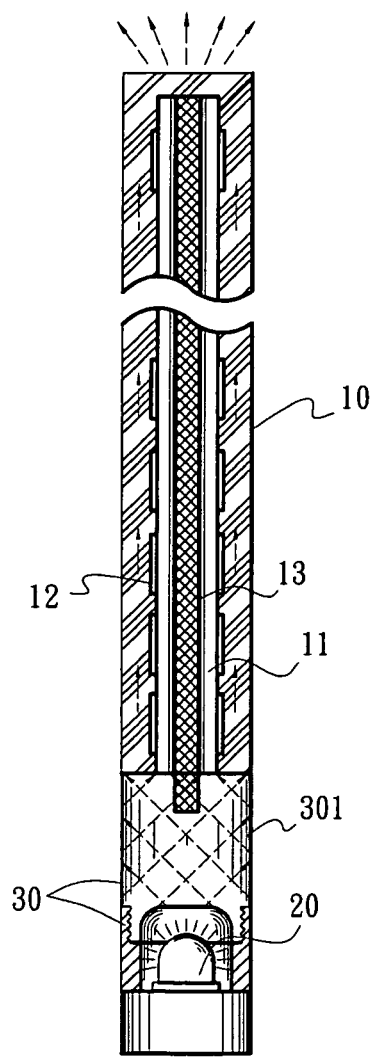
FIG. 7 is a sectional view showing that a light source is connected with the light guide strip body of the present invention.
Figure 8:
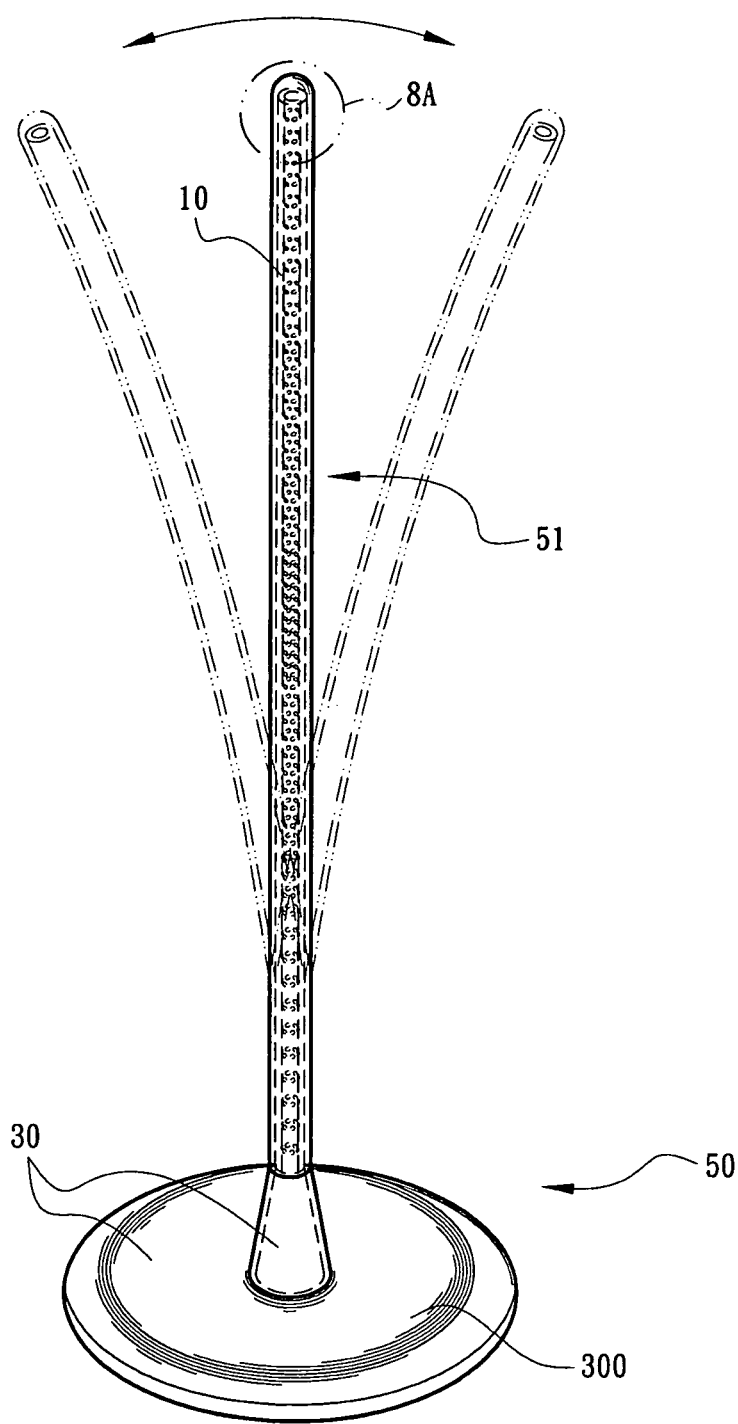
FIG. 8 is a perspective view showing that the present invention is combined with a base seat.
Figure 10:
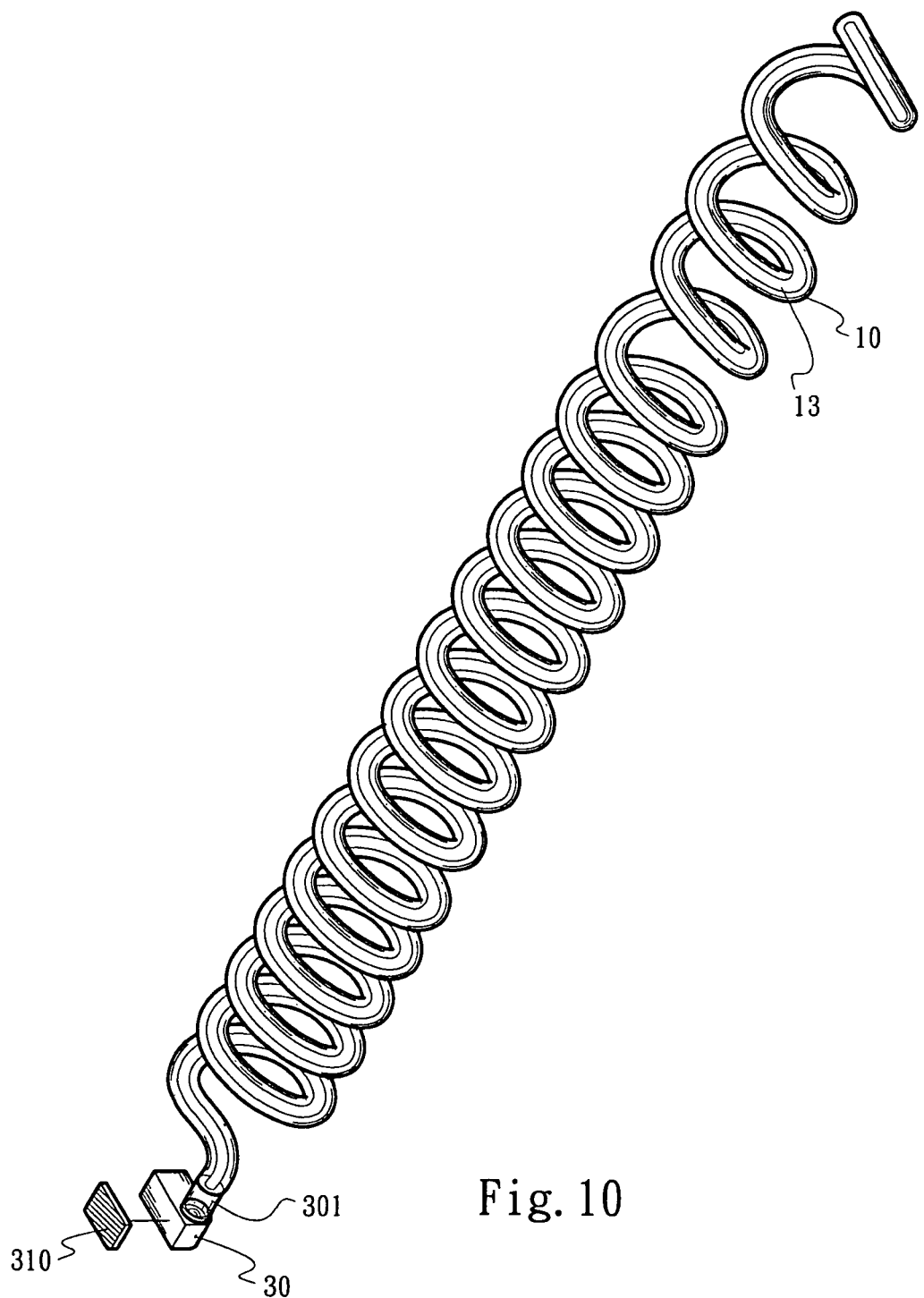
FIG. 10 is a perspective view of a preferred embodiment of the light guide strip body of the present invention, which is an elongated spiraled strip.

FIGS. 5 to 7 show another embodiment of the present invention, in which one end of the light guide strip body 10 is connected with a light-emitting device 30 in which the light source 20 is disposed. The light source 20 is placed on the ground or integrally extends from a base seat 300 of a fixed article (as shown in FIG. 8). In addition, a magnetic element (such as a magnet) 310 can be added to the light-emitting device 30 for attracting an iron surface or iron article (as shown in FIG. 10). Moreover, in order to uniformly axially project the light of the light source 20 into the end of the light guide strip body 10, a solid light uniformity element 301 is positioned between the light-emitting device 30 and the end of the light guide strip body 10. The light uniformity element 301 serves to uniformly guide and spread the originally centrally concentrated light of the light source 20 into uniform light with high luminance uniformity. The uniform light is then incident upon the end of the light guide strip body 10. Accordingly, the light of the light source 20 is prevented from being collectively incident upon the center of the end of the light guide strip body 10. Therefore, the light will not be stopped and reflected by the plastically flexible strip body 13 to cause loss of most of the light. Also, the light will not directly pass through the center of the internal chamber 11 and dissipate from the other end of the light guide strip body 10.

Figure 4:
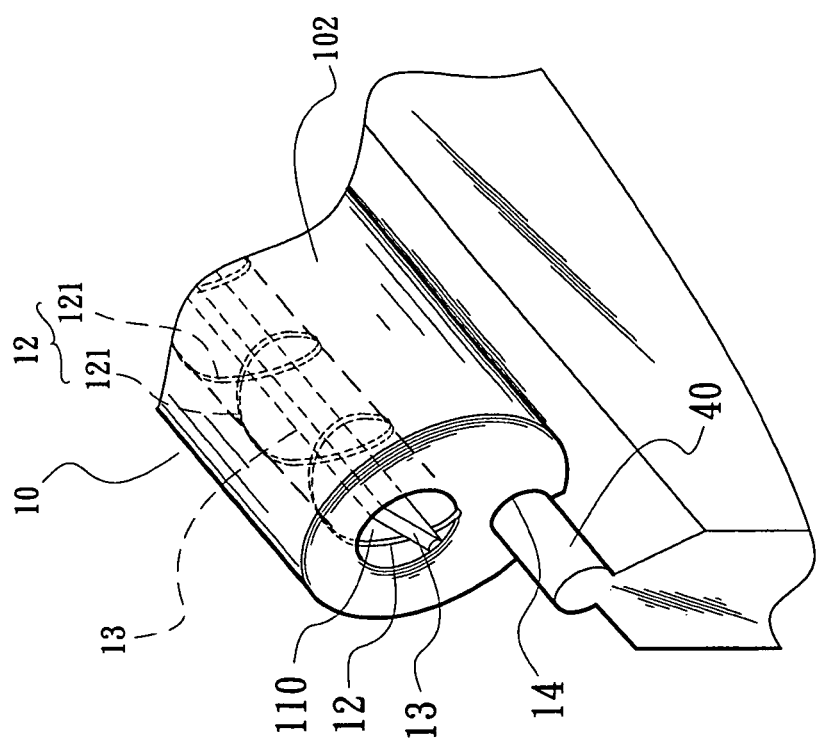
FIG. 4 is an enlarged perspective view of a part of a third embodiment of the present invention.

Furthermore, an outer circumference of the light guide strip body 10 can be formed with a channel 14 (as shown in FIG. 4). An insertion rib 40 of an article can be directly inserted into the channel 14 to connect the light guide strip body 10 with the article.

Figure 9:
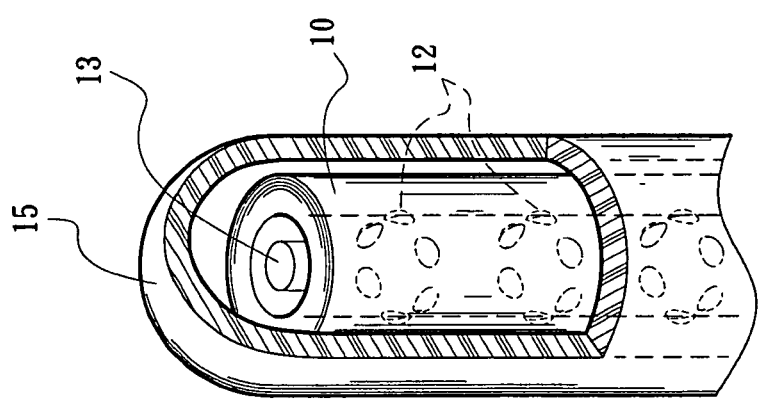
FIG. 9 is an enlarged view of circled area 8A of FIG. 8.
Figure 11:
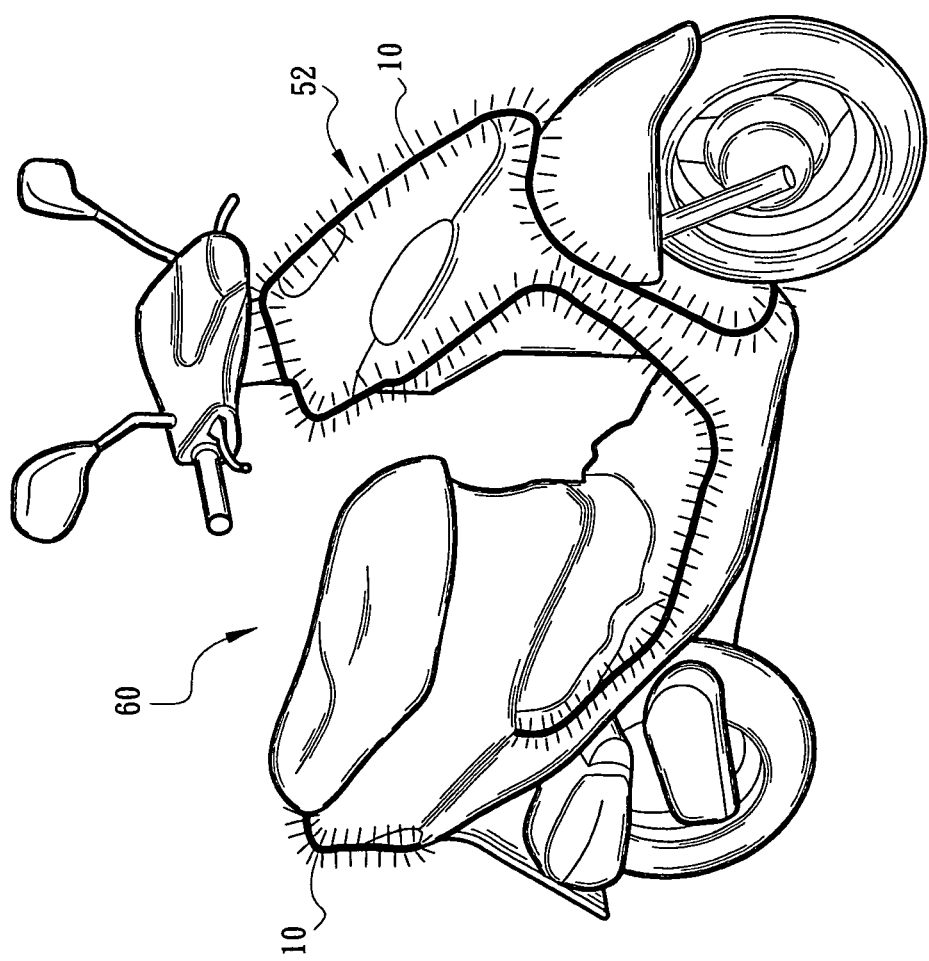
FIG. 11 is a view showing that the present invention is applied to a motorcycle as a light-emitting shape highlighter.
Figure 12:
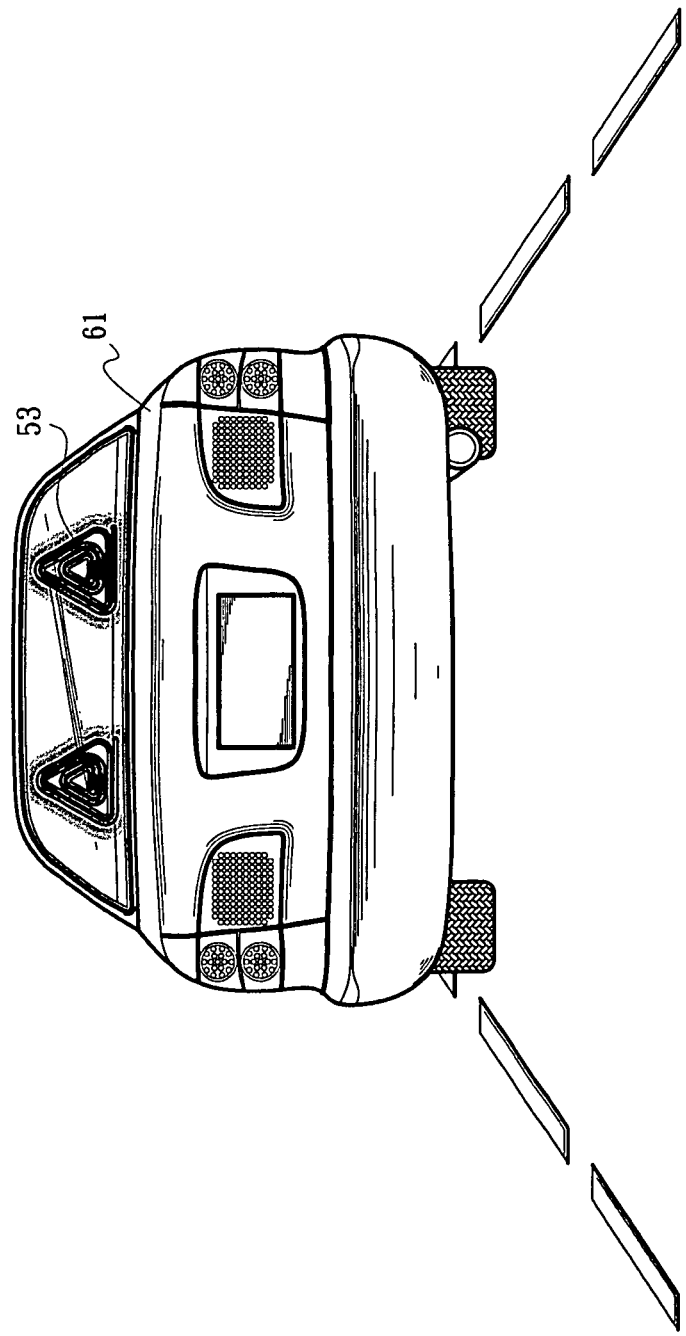
FIG. 12 is a view showing that the present invention is applied to a rear side of a car as a warning sign.
Figure 13:
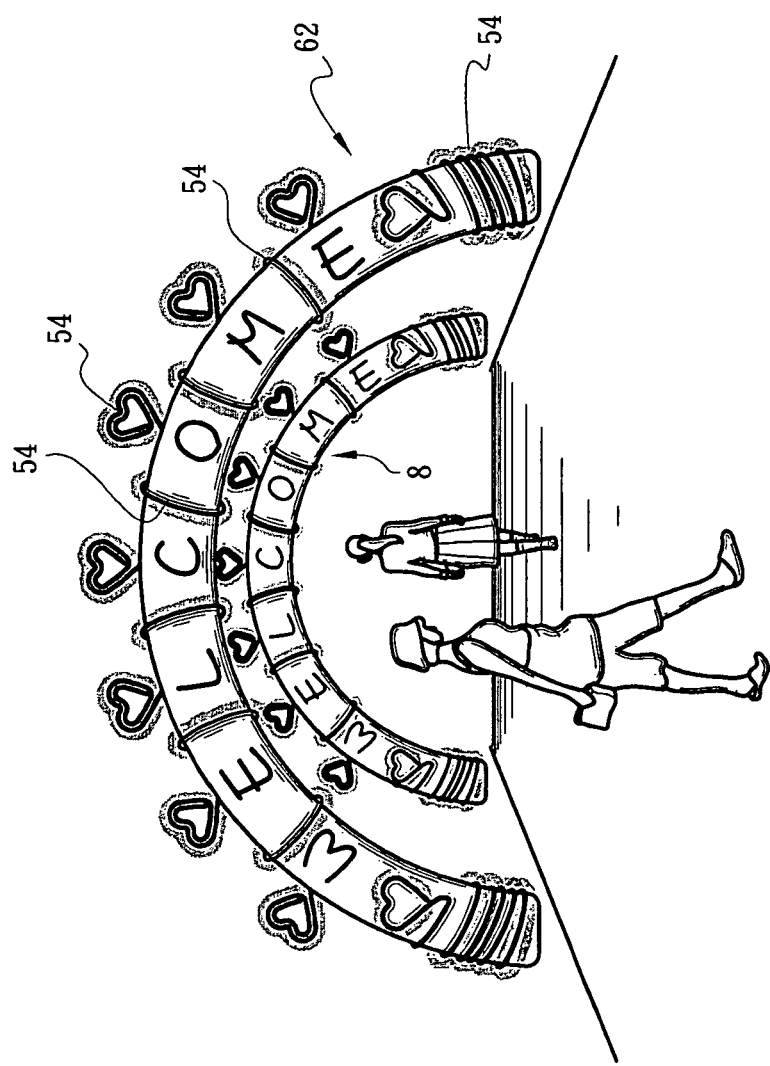
FIG. 13 is a view showing that the present invention is applied to an archway as a light-emitting decoration.
Figure 14:
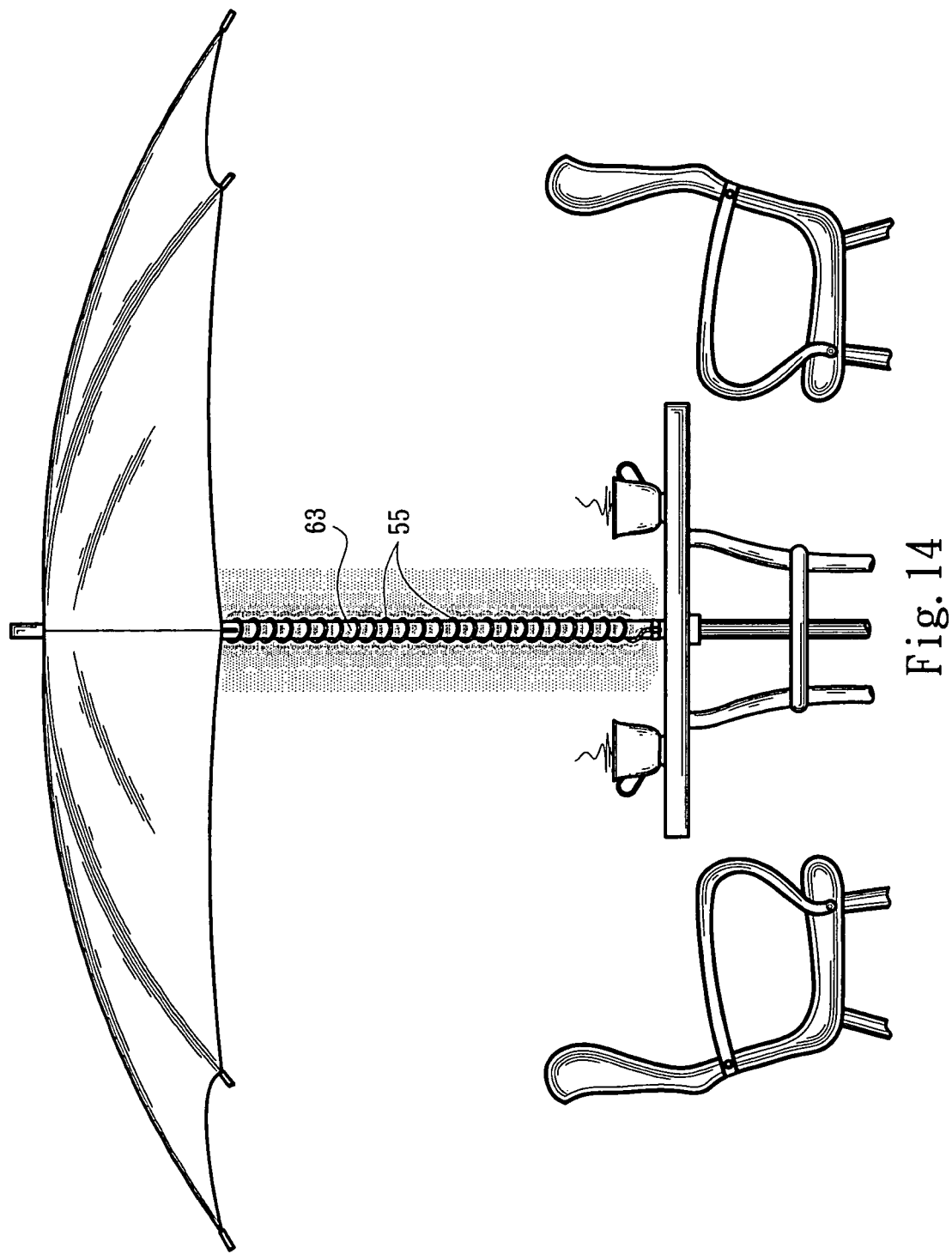
FIG. 14 is a view showing that the present invention is applied to a sunshade stem as a romantic light-emitting decoration.
Figure 15:
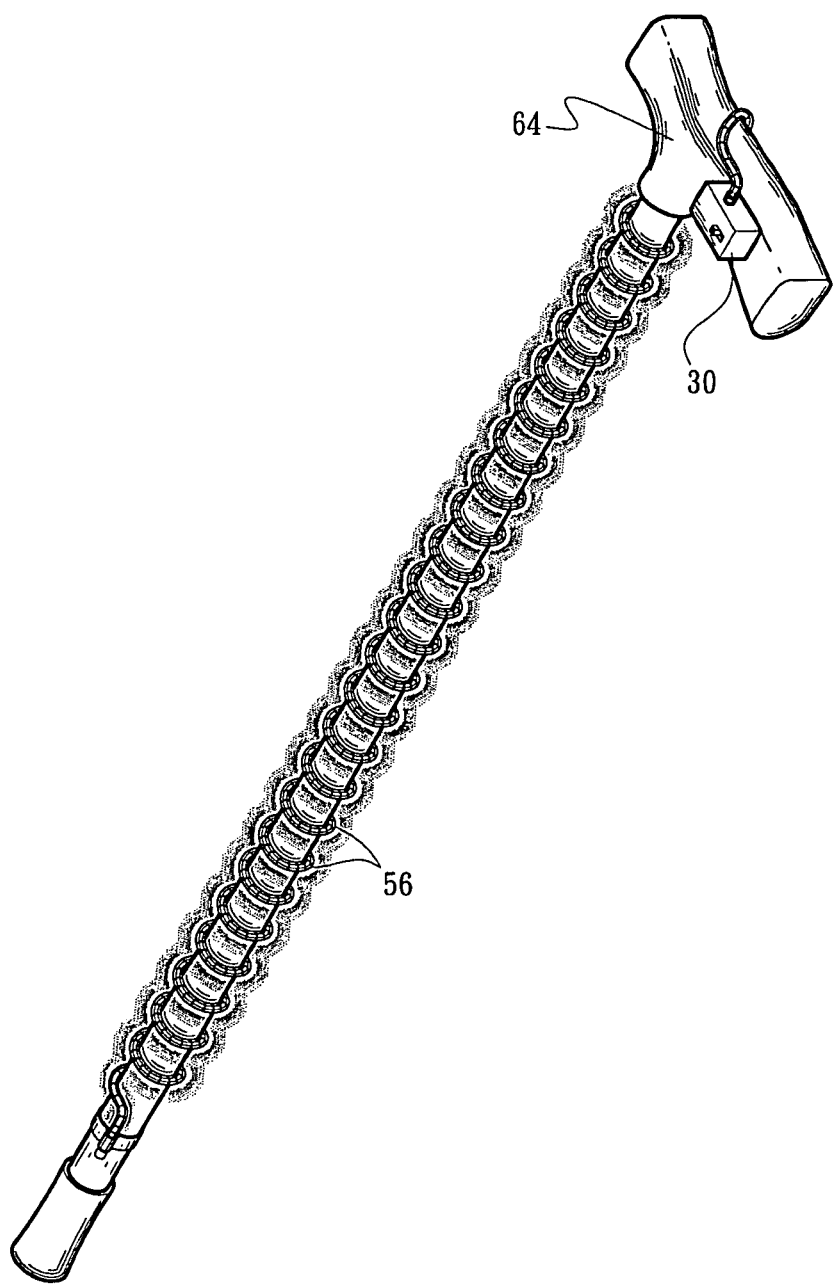
FIG. 15 is a perspective view showing that the present invention is applied to a cane as a light-emitting decorative strip wound around the cane.
Figure 16:
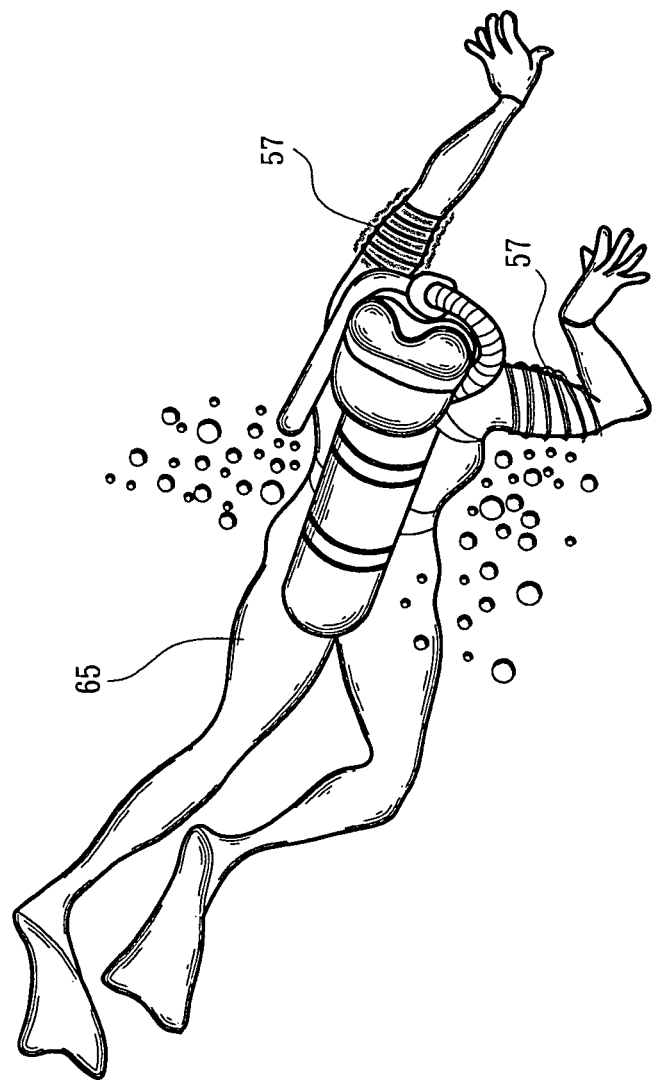
FIG. 16 is a view showing that the present invention is wound on a diver as a warning sign or a decoration.
Figure 17:
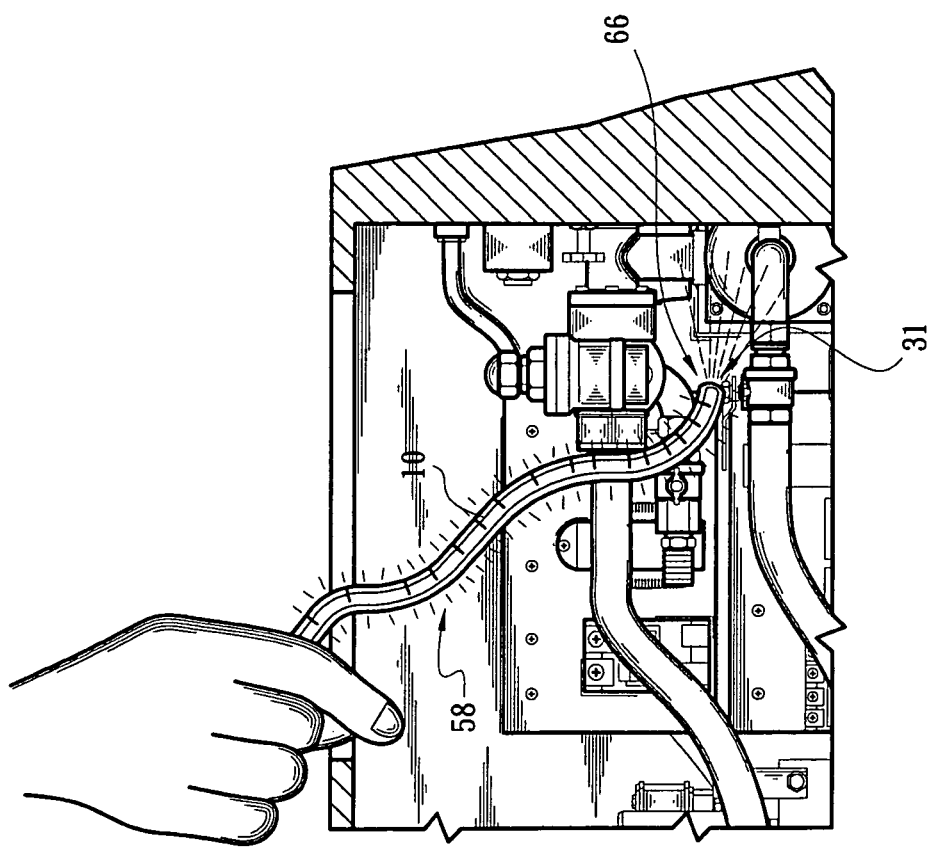
FIG. 17 is a view showing that the present invention is used as an illuminator for extending through a winding path into a deep place to provide illumination.

Please refer to embodiments of FIGS. 8 to 15. The light guide strip body 10 in these embodiments is a plastically flexible strip body having a shape memory, and is applicable to a pole 51 of a road warning sign 50 to form an anti-collision light-emitting safety sign as shown in FIG. 8. The recessed/raised sections 12 inside the light guide strip body 10 are able to enlarge and elongate (expand) the luminous range so as to enhance the indicating or warning effect for a road user in a remote place. Accordingly, the road user can have longer reaction time before possible collision so as to minimize the possibility of accident. In addition, the light guide strip body 10 (at least a free end thereof) is jacketed with an outer protective sheath 15 to protect the light guide strip body 10 from interference and damage by humidity, dust and other alien articles(as shown in FIG. 9). As shown in FIG. 10, the elongated plastically flexible light guide strip body 10 can be freely wound or spiraled into any configuration as personally desired. For example, as shown in FIG. 11, the plastically flexible light guide strip body 10 is used as a light-emitting shape highlighter 52 for a motorcycle 60. In FIG. 12, the plastically flexible light guide strip body 10 is used as a warning sign 53 of a rear side of a car 61. In FIG. 13, the plastically flexible light guide strip body 10 is used as a light-emitting decoration 54 of an archway 62. In FIG. 14, the plastically flexible light guide strip body 10 is used as a romantic light-emitting decoration 55 wound around a sunshade stem 63. In FIG. 15, the plastically flexible light guide strip body 10 is used as a light-emitting decorative strip 56 wound around a hand-carried article 64 (such as a cane). In FIG. 16, the plastically flexible light guide strip body 10 is used as a light-emitting decorative strip 57 directly wound on a person 65, such as a diver, for identification or highlighting at night or in a dim place. Moreover, as shown in FIG. 17, the plastically flexible light guide strip body 10 can serve as an illuminator 58, which can be extended through a winding path 66 deep into a complicated place (such as a deep section of an engine room where many components are located). In this case, the plastically flexible light guide strip body 10 of the present invention can be crimped into the illuminator 58 with a winding configuration. After extended through the winding path into a specific place, the other end of the plastically flexible light guide strip body 10 can project light onto the specific place to provide illumination. Also, the entire periphery of the light guide strip body 10 provides sufficient illumination for the complicated and winding path.

The above embodiments are only used to illustrate the present invention, not intended to limit the scope thereof. Many modifications of the above embodiments can be made without departing from the spirit of the present invention.

What is claimed is:

1. A freely plastically flexible light-emitting strip structure, comprising:
    a single piece hollow light guide strip body made of transparent material, the light guide strip body being formed with an inside circumferential wall defining at least one axial internal chamber;
    said inside circumferential wall integrally forming at least one recessed/raised section as a spiral stripe for changing a light path and emitting light to an outer side of the light guide strip body; and
    a plastically flexible and bendable strip body being implanted in the internal chamber.

2. The freely plastically flexible light-emitting strip structure as claimed in claim 1, wherein a light absorption material is disposed on a wall of the internal chamber.

3. The freely plastically flexible light-emitting strip structure as claimed in claim 1, wherein a color bar is implanted in the internal chamber.

4. The freely plastically flexible light-emitting strip structure as claimed in claim 1, wherein a light reflection strip is implanted in the internal chamber.

5. The freely plastically flexible light-emitting strip structure as claimed in claim 1, wherein a light source is arranged at least one end of the light guide strip body.

6. The freely plastically flexible light-emitting strip structure as claimed in claim 2, wherein a light source is arranged at least one end of the light guide strip body.

7. The freely plastically flexible light-emitting strip structure as claimed in claim 3, wherein a light source is arranged at least one end of the light guide strip body.

8. The freely plastically flexible light-emitting strip structure as claimed in claim 4, wherein a light source is arranged at least one end of the light guide strip body.

9. The freely plastically flexible light-emitting strip structure as claimed in claim 5, wherein the light source is disposed in a base seat.

10. The freely plastically flexible light-emitting strip structure as claimed in claim 1, wherein a light uniformity element is connected with an end of the light guide strip body for uniformly spreading light.

11. The freely plastically flexible light-emitting strip structure as claimed in claim 2, wherein a light uniformity element is connected with an end of the light guide strip body for uniformly spreading light.

12. The freely plastically flexible light-emitting strip structure as claimed in claim 3, wherein a light uniformity element is connected with an end of the light guide strip body for uniformly spreading light.

13. The freely plastically flexible light-emitting strip structure as claimed in claim 4, wherein a light uniformity element is connected with an end of the light guide strip body for uniformly spreading light.

14. The freely plastically flexible light-emitting strip structure as claimed in claim 5, wherein a light uniformity element is connected with an end of the light guide strip body for uniformly spreading light.

15. The freely plastically flexible light-emitting strip structure as claimed in claim 9, wherein a light uniformity element is connected with an end of the light guide strip body for uniformly spreading light.

16. The freely plastically flexible light-emitting strip structure as claimed in claim 5, wherein a light uniformity element is positioned between the light guide strip body and the light source for uniformly spreading light.

17. The freely plastically flexible light-emitting strip structure as claimed in claim 9, wherein a light uniformity element is positioned between the light guide strip body and the light source for uniformly spreading light.

18. The freely plastically flexible light-emitting strip structure as claimed in claim 1, wherein the light guide strip body is jacketed with an outer protective sheath.

19. The freely plastically flexible light-emitting strip structure as claimed in claim 5, wherein the light guide strip body is jacketed with an outer protective sheath.

20. The freely plastically flexible light-emitting strip structure as claimed in claim 9, wherein the light guide strip body is jacketed with an outer protective sheath.

21. The freely plastically flexible light-emitting strip structure as claimed in claim 10, wherein the light guide strip body is jacketed with an outer protective sheath.

22. The freely plastically flexible light-emitting strip structure as claimed in claim 1, further comprising a magnetic element connected with the light guide strip body.

23. The freely plastically flexible light-emitting strip structure as claimed in claim 5, further comprising a magnetic element connected with the light guide strip body.

24. The freely plastically flexible light-emitting strip structure as claimed in claim 9, further comprising a magnetic element connected with the light guide strip body.

25. The freely plastically flexible light-emitting strip structure as claimed in claim 10, further comprising a magnetic element connected with the light guide strip body.

26. The freely plastically flexible light-emitting strip structure as claimed in claim 16, further comprising a magnetic element connected with the light guide strip body.

27. The freely plastically flexible light-emitting strip structure as claimed in claim 18, further comprising a magnetic element connected with the light guide strip body.

* * * * *